United States Patent

[11] 3,607,972

[72] Inventors James D. Kiles;
Robert C. Hartlein; Harold L. Vincent, all of Midland, Mich.
[21] Appl. No. 881,298
[22] Filed Dec. 1, 1969
[45] Patented Sept. 21, 1971
[73] Assignee Dow Corning Corporation
Midland, Mich.

[54] ROOM TEMPERATURE VULCANIZABLE SILOXANE BLOCK COPOLYMER
18 Claims, No Drawings
[52] U.S. Cl. .................................................. 260/825 R, 117/161 ZA, 260/31.2 R, 260/32.8 SB, 260/33.6 SB, 260/33.8 SB, 260/37 SB, 260/46.5 G, 260/46.5 E
[51] Int. Cl. ...................................................... C08g 47/00
[50] Field of Search ........................................... 260/46.5, 46.5 G, 825

[56] References Cited
UNITED STATES PATENTS
| | | | |
|---|---|---|---|
| 3,294,718 | 12/1966 | Antonen...................... | 260/18 |
| 3,308,080 | 3/1967 | Haenni........................ | 260/29.1 |
| 3,308,203 | 3/1967 | Metevia....................... | 260/825 |

Primary Examiner—Donald E. Czaja
Assistant Examiner—M. I. Marquis
Attorneys—Robert F. Fleming, Jr., Laurence R. Hobey, Harry D. Dingman, Howard W. Hermann and Roger H. Borrousch ABSTRACT: A room temperature vulcanizable siloxane block and a monoorganosiloxane block being endblocked with monoorganodiacetoxysiloxy units, monoorganodiketoximesiloxy units or monoorganodialkoxysiloxy units where the polydiorganosiloxane block is a mixture of polydiorganosiloxane blocks having 6 to 40 diorganosiloxane units per block and polydiorganosiloxane blocks having 200 to 500 diorganosiloxane units per block where the mixture has an average of from 25 to 460 diorganosiloxane units per block can be a resin or an elastomer, useful as caulking compounds, sealants, roof coatings, adhesives, optically clear compositions and low modulus compositions.

ROOM TEMPERATURE VULCANIZABLE SILOXANE BLOCK COPOLYMER

This invention relates to room temperature vulcanizable compositions which are block copolymers.

Block copolymers having a polydiorganosiloxane block and a block of monoorganosiloxane units are known in the art. However, the polydiorganosiloxane blocks are described as having an average number of diorganosiloxane units per block. This terminology is common in the polymeric art, since polymers usually are mixtures of various molecular weights where the average molecular weight would be a molecular weight of certain polymers which would be close to the molecular weight of the particular species which exists as the most abundant in the mixture. There is no advantage described in the art which would suggest any benefit from a mixture of two polydiorganosiloxanes of widely varying chain lengths. It is therefore totally unexpected that room temperature vulcanizable organosiloxane block copolymers having polydiorganosiloxane blocks of a mixture of polydiorganosiloxanes of widely varying chain lengths would have certain advantages not observed from conventional polydiorganosiloxane. This, therefore, is the object of the present invention.

This invention relates to a room temperature vulcanizable composition stable in the absence of moisture and curable upon exposure to moisture consisting essentially of an organosiloxane block copolymer consisting essentially of (A) 24 to 84 inclusive mol percent of diorganosiloxane units wherein the diorganosiloxane units are bonded through silicon-oxygen-silicon bonds forming polydiorganosiloxane block, said polydiorganosiloxane block consisting essentially of a mixture of (1) polydiorganosiloxane blocks having an average of from 6 to 40 inclusive diorganosiloxane units per block and (2) polydiorganosiloxane blocks having an average of from 200 to 500 inclusive diorganosiloxane units per block, polydiorganosiloxane blocks (1) and (2) being present in amounts sufficient to provide an average of 25 to 460 diorganosiloxane units per block in the total amount of the polydiorganosiloxane block in (A), said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units, (B) 11 to 68 inclusive mol percent organosiloxane units having an average formula $R_xSiO_{4_{1/2}}$ where $x$ has a value of from 1 to 1.3 inclusive and R is an organic group selected from the groups consisting of aryl radicals, vinyl radicals, and alkyl radicals having from 1 to 3 inclusive carbon atoms per radical, said organic groups being at least 50 percent aryl radicals based on the total number of organic groups in (B), said organosiloxane units comprise a block of at least 3 organosiloxane units and said organosiloxane units being selected from monoorganosiloxane units and diorganosiloxane units, and (C) 2 to 27 inclusive mol percent of endblocking siloxane units of the formula $R'SiY_yO_{3_{1y/2}}$ where $y$ has an average value from 1.8 to 2 inclusive, R' is an organic radical selected from the group consisting of alkyl radicals having from 1 to 5 inclusive carbon atoms, phenyl radicals and vinyl radicals and Y is a monovalent radical selected from the group consisting of acetoxy radicals, alkoxy radicals having from 1 to 5 inclusive carbon atoms per radical and radicals of the formula —O—N=X wherein X is selected from the group consisting of radicals of the formula $R''_2C=$ and

in which R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals, the mol percentages of (A), (B) and (C) being based on the total number of siloxane units in the organosiloxane block copolymer.

The room temperature vulcanizable composition of the present invention can best be prepared by coupling a hydroxyl terminated polydiorganosiloxane with an aromatic containing organosiloxane resin having silicon-bonded hydroxyl groups through a trifunctional organosilane to produce a hydroxylated block copolymer which is reacted with monoorganotriacetoxysilane, monoorganotriketoximesilane or monoorganotrialkoxysilane to yield the room temperature vulcanizable composition which is a monoorganodifunctionalsiloxy endblocked organosiloxane block copolymer.

This invention also relates to a method for preparing a room temperature vulcanizable composition comprising (I) mixing in an inert organic solvent under anhydrous conditions (A') a hydroxyl terminated polydiorganosiloxane which is a mixture of (1') a hydroxyl terminated polydiorganosiloxane having an average from 6 to 40 inclusive diorganosiloxane units per molecule and (2') a hydroxyl terminated polydiorganosiloxane having an average from 200 to 500 inclusive diorganosiloxane units per molecule, said hydroxyl terminated polydiorganosiloxanes (1') and (2') being present in the mixture in amounts sufficient to provide an average of 25 to 460 diorganosiloxane units per molecule in the mixture, said hydroxyl terminated polydiorganosiloxane block (A') being at least 80 mol percent dimethylsiloxane units based on the total number of siloxane units in (A') and any remaining units being selected from the groups consisting of phenylmethylsiloxane units and monomethylsiloxane units and said hydroxyl terminated polydiorganosiloxane (A') having from 0.1 to 1.82 weight percent silicon bonded hydroxyl radicals, and (B') a trifunctional organosilane of the formula $RSiX_3$ in which R is a monovalent organic radical selected from the group consisting of phenyl, vinyl, methyl, ethyl and propyl radicals and X is a hydrolyzable radical selected from the group consisting of acetoxy, ketoxime, chlorine and alkoxy wherein (B') is present in an amount sufficient to provide at least one $RSiX_3$ per silicon-bonded hydroxyl radical whereby a $RX_2SiO_{0.5}$ terminated polydiorganosiloxane is obtained in an inert organic solvent, (II) adding under anhydrous conditions to the $RX_2SiO_{0.5}$ terminated polydiorganosiloxane in an inert organic solvent obtained in (I), (C') a hydroxylated organosiloxane resin of the average unit formula $R'_xSiO_{4_{1x/2}}$ where R' is a monovalent organic radical selected from the group consisting an aryl radical, a methyl radical, an ethyl radical and a propyl radical and $x$ has an average value of from 1 to 1.3 inclusive in said hydroxylated organosiloxane resin at least 50 percent of the monovalent organic radical being aryl radicals and from 2 to 10 weight percent silicon-bonded hydroxyl radicals based on the total weight of (C'), the mixture is agitated at a temperature of from room temperature to 130° C. for at least 15 minutes whereby a hydroxylated organosiloxane block copolymer having from 0.5 to 5 weight percent silicon-bonded hydroxyl radicals is obtained in an inert organic solvent, thereafter (III) adding under anhydrous conditions to the hydroxylated organosiloxane block copolymer obtained in (II), (D') a trifunctional organosilane off the formula $R''SiY_3$ in which R'' is a monovalent organic radical selected from the group consisting of an alkyl radical having from 1 to 5 inclusive carbon atoms, a phenyl radical and a vinyl radical and Y is a hydrolyzable radical selected from the group consisting of acetoxy, alkoxy radicals having from 1 to 5 inclusive carbon atoms per radical and ketoxime radicals of the formula —O—N=Z wherein Z is selected from the group consisting of radicals of the formula $R'''_2C=$ and

in which each $R^{iv}$ is selected from the group consisting of divalent hydrocarbon radicals and halogenated divalent hydrocarbon radicals and each R''' is a radical selected independently from the groups consisting of monovalent hydrocarbon radicals, and (IV) maintaining the mixture of (III) at a temperature of from room temperature to 200° C. for a time sufficient to essentially render the hydroxylated organosiloxane block copolymer free of silicon-bonded hydroxyl radicals whereby a R''SiY$_2$O$_{0.5}$ endblocked organosiloxane block copolymer is obtained (A') being present in an amount sufficient to provide from 24 to 84 inclusive mol percent diorganosiloxane units, (B')+(C') being present in an amount sufficient to provide from 11 to 68 inclusive mol percent organosiloxane units, and (D') being present in an amount sufficient to provide from 2 to 27 inclusive mol percent R''SiY$_2$O$_{0.5}$ endblock units, the sum of (A'), (B'), (C') and (D') being 100 mol percent.

The inert organic solvents suitable for use in the present invention are any of those organic solvents which are solvents for the organosiloxanes and which are not reactive with the ingredients, such as alcohols. Examples of suitable inert organic solvents include toluene, xylene, diethylether, benzene, chlorothene, cyclohexane, carbon tetrachloride, chlorotoluene, dichlorobenzene, acetone, cyclohexanone, methylethylketone, butyrone, methylisopropylketone, trichloromonofluoromethane, dichlorodifluoromethane, monochlorotrifluoroethane, dichloromonofluoromethane, monochlorodifluoromethane, tetrachlorodifluoroethane, trichlorotrifluoroethane, dichlorotetrafluoroethane and butylacetate.

The amount of the inert organic solvent used can vary broadly, preferably a final product mixture containing 50 to 80 weight percent inert organic solvent is used. Amounts up to 95 weight percent could be used but large amounts of solvent is not economical.

All the reaction steps are carried out under anhydrous conditions. By "anhydrous conditions" it is to be understood that for all practical purposes the reaction system does not contain water in any form. This does not mean that water is absolutely absent, but reasonable precautions should be taken not to contaminate the reaction system with water, such as solvents containing water in significant amounts, 1 to 2 weight percent or more. Trace amounts of water can be tolerated and do not change the overall results of the process.

Ingredient (A') is a hydroxyl terminated polydiorganosiloxane which is a mixture of two hydroxyl terminated polydiorganosiloxanes of different chain lengths. One of the hydroxyl terminated polydiorganosiloxanes (1') has an average from 6 to 40 inclusive diorganosiloxane units bonded through silicon-oxygen-silicon bonds. The hydroxyl terminated polydiorganosiloxanes (1') are polymeric mixtures in themselves and contain molecular species outside the range of 6 to 40, however they do not contain any appreciable detectable amount of molecular species having 100 or more diorganosiloxane units per molecule, with the total of any such species being less than one weight percent. The second hydroxyl terminated polydiorganosiloxane (2') has an average from 200 to 500 inclusive diorganosiloxane units bonded through silicon-oxygen-silicon bonds. The hydroxyl terminated polydiorganosiloxanes (2') are polymeric mixtures in themselves and contain molecular species outside the range of 200 to 500 however they do not contain any appreciable detectable amount of molecular species having 100 or less diorganosiloxane units per molecule, with the total of any such species being less than one weight percent.

The hydroxyl terminated polydiorganosiloxanes (1') and (2') are mixed to provide the hydroxyl terminated polydiorganosiloxane (A') which has an average of from 25 to 460 inclusive diorganosiloxane units per molecule and from 0.1 to 1.82 weight percent silicon-bonded hydroxyl radicals. The amounts of (1') and (2') can thus vary broadly, however, the present invention requires that both (1') and (2') must be present.

The hydroxyl terminated polydiorganosiloxanes (A') are at least 80 mol percent dimethylsiloxane units. Any remaining siloxane units can be phenylmethylsiloxane units or monomethylsiloxane units. The hydroxyl terminated polydiorganosiloxanes of (A') preferably are all dimethylsiloxane units. The phenylmethylsiloxane units or the monomethylsiloxane units are present in amounts of 10 mol percent or less each. Preferably, the monomethylsiloxane is absent or present in small amounts, such as less than 2 mol percent. The phenylmethylsiloxane units and the monomethylsiloxane units when present can be in either (1') or (2') or both, since the particular location is not critical.

The hydroxyl terminated polydiorganosiloxane (A') is mixed with a trifunctional organosilane (B') of the formula RSiX$_3$ in which R is phenyl, vinyl, methyl, ethyl or propyl and X is acetoxy, alkoxy, ketoxime or chlorine. The alkoxy radicals have from 1 to 5 inclusive carbon atoms per radical, such as methoxy, ethoxy, propoxy, isopropoxy, butoxy and pentoxy. The ketoxime radicals have a formula —O—N=Z where Z is R$_2'''$C= or

in which each R$^{iv}$ is selected from the group consisting of divalent hydrocarbon radicals and halogenated divalent hydrocarbon radicals and each R''' is a radical selected independently from the group consisting of monovalent hydrocarbon radicals and halogenated hydrocarbon radical. More specifically R''' can be, for example, any alkyl radical such methyl, ethyl, isopropyl and octodecyl; any alkenyl radical such as vinyl and decenyl; any cycloalkyl radical such as cyclohexyl radicals; any cycloalkenyl radical such as cyclopentenyl; any aryl radical such as phenyl and naphthyl radicals; any aralkyl radicals such as benzyl and any alkaryl radical such as totyl. Any of the monovalent hydrocarbon radicals can be halogenated to give radicals such as, chloromethyl, 3,3,3-trifluoropropyl, perchlorophenyl and 2,4-dibromobenzyl radicals all of which are operative.

R$^{iv}$ can be any divalent hydrocarbon radical or divalent halogenated hydrocarbon radical in which the two valences are attached to the C of the C=NO— group. R$^{iv}$ can be, for example,

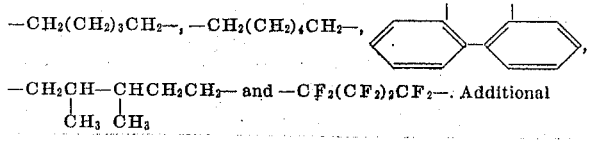

examples of R''' and R$^{iv}$ can be found in U.S. Pat. No. 3,184,427 and No. 3,189,576 which are incorporated by reference.

Illustrative examples of trifunctional organosilanes (B') are methyltriacetoxysilane, phenyltriacetoxysilane, phenyltrichlorosilane, ethyltrimethoxysilane, methyltri(methylethylketoxime) silane, vinyltris (dimethylketoxime) silane, propyltriacetoxysilane, vinyltriacetoxysilane, propyltriethoxysilane, phenyltriisopropoxysilane, methyltripentoxysilane and phenyltri (methylethylketoxime) silane.

The trifunctional organosilane (B') is mixed with the hydroxyl terminated polydiorganosiloxane (A') in an amount sufficient to provide at least one RSiX$_3$ per silicon-bonded hydroxyl radical. An excess of RSiX$_3$ can be used but the excess is preferably not greater than 10 or 15 mol percent over the amount necessary to provide on RSiX$_3$ per silicon-bonded hydroxyl radical of the hydroxyl terminated polydiorganosiloxane (A'). The RSiX$_3$ used to endblock the hydroxyl endblocked polydiorganosiloxane (A') is considered as a part of the organosiloxane block (B) of the final monoorganodifunctionalsiloxy endblocked organosiloxane block copolymer. This should be taken into account when excess amounts are needed in the preparation. The preparation of the mixture of the hydroxyl endblocked polydiorganosiloxane (A') and trifunctional organosilane (B') in the inert organic solvent should be carried out under anhydrous conditions. The reaction produces a monoorganodifunctionalsiloxy endblocked polydiorganosiloxane. The temperature of the mixture can vary broadly, preferably from room temperature to the boiling point of the mixture. Catalysts are not necessary, however, when alkoxyfunctional organosilanes are used it is preferred to use a catalyst such as tetraisopropyltitanate and normal hexylamine added separately. The reaction takes place readily and is complete within a short period of time. The reaction mixture is usually allowed to react for one hour to insure complete reaction, however, shorter or longer periods can be used. Preferably (B') is an acetoxy or ketoxime organosilane, since these readily react and go to completion at room temperature within an hour to produce the monoorganodifunctionalsiloxy ($RSiX_2O_{0.5}$) endblocked polydiorganosiloxanes.

To the $RSiX_2O_{0.5}$ endblocked polydiorganosiloxane in an inert organic solvent, a hydroxylated organosiloxane resin is added. The addition and the reaction are carried out under anhydrous conditions. The resulting mixture is agitated at a temperature ranging from room temperature to 130° C. for at least 15 minutes, preferably for at least 30 minutes. Times greater than about 4 hours are usually not necessary, however, they are not detrimental to the overall product. Long periods of time at the higher temperatures can be used to reduce the final silicon-bonded hydroxyl radical concentration of the resulting block copolymer, if so desired.

The hydroxylated organosiloxane resin (C') has an average unit formula $R'_xSiO_{4-x/2}$ where $R'$ is a monovalent organic radical selected from the group consisting of aryl, methyl, ethyl and propyl and $x$ is from 1 to 1.3 inclusive. At least 50 percent of the monovalent organic radicals, $R'$, are aryl radicals and the hydroxylated organosiloxane resin has from 2 to 10 weight percent silicon-bonded hydroxyl radicals, preferably from 3 to 7 weight percent, based on the total weight of (C'). Any aryl radical is suitable for the present invention and include, for example, such species as phenyl, tolyl, xylyl, xenyl, naphthyl and anthracyl. The organosiloxane units of (C') can all be the same, aryl, or can be mixtures of various organosiloxane units, however, the organosiloxane units are monoorganosiloxane units or diorganosiloxane units. Illustrative examples of the organosiloxane units of (C') are monoorganosiloxane units such as phenylsiloxane, tolylsiloxane, xylylsiloxane, xenylsiloxane, naphthylsiloxane, methylsiloxane, ethylsiloxane and propylsiloxane and diorganosiloxane units such as dimethylsiloxane, diethylsiloxane, diphenylsiloxane, dinaphtylsiloxane, methylphenylsiloxane, methylethylsiloxane, methylpropylsiloxane, propylsiloxane, methyltolylsiloxane, methylnaphthylsiloxane, ethylphenylsiloxane, propyltolylsiloxane, ethylpropylsiloxane and methylxenylsiloxane. Small amounts of other siloxane units, such as triorganosiloxane units and $SiO_2$ units as well as, monoorganosiloxane units and diorganosiloxane units with other organic groups can be tolerated up to amounts of 1 or 2 mol percent without departing from the present invention.

The resulting product from the reaction between the $RSiX_2O_{0.5}$ endblocked polydiorganosiloxane and the hydroxylated organosiloxane resin (C') is a hydroxylated organosiloxane block copolymer having from 0.5 to 5 weight percent silicon-bonded hydroxyl radicals, preferably from 1 to 4.5 weight percent silicon-bonded hydroxyl radicals.

A trifunctional organosilane (D') of the formula $R''SiY_3$ in which $R''$ is a monovalent organic radical selected from an alkyl radical having from 1 to 5 inclusive carbon atoms, a phenyl radical and a vinyl radical and Y is a hydrolyzable radical selected from acetoxy, alkoxy radicals having from 1 to 5 carbon atoms per radical and ketoxime radicals of the formula —O—N=Z where Z is defined above, is added to the hydroxylated organositoxane block copolymer in the inert organic solvent under anhydrous conditions. The alkyl and alkoxy radicals are illustrated above.

The trifunctional organosilanes $R''SiY_3$ can be illustrated by ketoxime silanes such as, $CH_3Si[ON=C(CH_3)_2]_3$, $CH_3Si[ON=C(CH_2CH_3)(CH_3)]_3$,
$C_6H_5Si[ON=C(CH_3)_2]_3$, $CH_2=CHSi[ON=C(CH_2CH_3)(CH_3)]_3$,
$CH_3CH_2Si[ON=C(C_6H_5)(CH_3)]_3$, $(CH_3)_2CHSi[ON=C(CHCH_3)_2]_3$, $CH_3(CH_2)_4Si[ON=\overset{CH_3}{\overset{|}{C}}(CH_2)_3CH_2]_3$,
$CH_2=CHSi[ON=C(CH=CH_2)(C_6H_5)]_3$ and others as described in U.S. Pat. No. 3,189,576, acetoxysilanes such as methyltriacetoxysilane, ethyltriacetoxysilane, propyltriacetoxysilane, butyltriacetoxysilane, phenyltriacetoxysilane, pentyltriacetoxysilane and vinyltriacetoxysilane and alkoxysilanes such as methyltrimethoxysilane, ethyltrimethoxysilane, propyltrimethoxysilane, butyltrimethoxysilane, phenyltrimethoxysilane, pentyltrimethoxysilane, vinyltrimethoxysilane, methyltriethoxysilane, ethyltriethoxysilane, phenyltriethoxysilane, butyltripropoxysilane, pentyltriisopropoxysilane, vinyltributoxysilane, vinyltripentoxysilane, methyltripentoxysilane, ethyltributoxysilane, methyldimethoxyethoxysilane, methyldiethoxymethoxysilane, ethyldiethoxymethoxysilane and phenyltripropoxysilane. The mixture of the hydroxylated organosiloxane block copolymer and the $R''SiY_3$ in the inert organic solvent are maintained at a temperature from room temperature to 200° C. for a period of time which is sufficient to essentially render the hydroxylated organosiloxane block copolymer free of silicon-bonded hydroxyl radicals. By the phrase "for a period of time which is sufficient to essentially render the hydroxylated organosiloxane block copolymer free of silicon-bonded hydroxyl radical," it is to be understood that the mixture is allowed to react until no more detectable hydroxyl radicals are observed. The time is preferably from 30 minutes to 4 hours.

When alkoxysilanes are used, a catalyst should be used, preferably an organotitanate and an organoamine added separately.

The organotitanates can be any of the well known organotitanates such as tetraethyltitanate, tetraisopropyl titanate, tetra-n-butyl titanate, tetra-2-ethylhexyl titanate tetraphenyl titanate, tetraoctadecyl titanate, tetra-12-octadecenyl titanate, triethanolamine titanate, $[HOC_3H_6)_2N(CH_2)_3O]_2Ti[OCH(CH_3)_2]_2$, $[(CH_3CH_2)_2N(CH_2)_2O]_4Ti$, $[(C_6H_{13})_2N(CH_2)_6O]_2Ti[OCH_2CH(CH_3)_2]_2$, $[C_4J_9NH(CH_2)_4O]_4Ti$, $(HOCH_2CH_2NHCH_2O)_4Ti$, tetrakistriethanolamine titanate-N-stearate, ethylene glycol titanate, $Ti[OCH_2CH(CH_2CH_3)CH(OH)CH_2CH_2CH_3]_4$, tetra (methylcellosolve)-titanate, bis(acetylacetonyl)diisopropyl titanate,

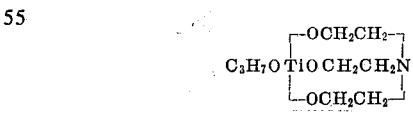

$[HOOCCH(CH_3)O]_4Ti$, $[HOOC(CH_2)_4O]_2Ti(OH)_2$, $(CH_3COOCH_2.4Ti$, $(CH_3OOCCH_2O)_4Ti$ and diisopropyldiacetoxy titanate.

Any of the above titanates can be employed and, in addition part or all of the organoxy radicals can be replaced by $Z_3SiO$- radicals wherein Z in a monovalent organic radical.

The can be a primary amine, a secondary amine or a tertiary amine. The amine can contain one or more amino groups and can also contain carbon-bonded silicon atoms and other functional organic groups which are free of active hydrogen.

Specific examples of operative amines are o-aminoacetanilide, iminodiacetonitrile, m-aminoacetophenone, allylamine, N-methylallylamine, amylamine, N,N-dimethylamylamine, aniline, p-bromoaniline, 2,6-dinitroaniline, m-fluoroaniline, sym-bis-gamma-aminopropyl-tetramethyl-disiloxane, gamma(N-aminoethylamino)propyldiphenylmethylsilane, o-iodoaniline, oinitroaniline, 2,3,4,5-tetrachloroaniline, o-anisidine, 9-anthrylamine, 4,4'-diaminoazobenzene, anthranilonitrile, benzylamine, p-methoxybenzylamine, decylamine, diallylamine, dicyclohexylamine, diethylenetriamine, difurfurylamine, di-m-tolylamine, β-ethoxyethylamine, tetrahydrofurfurylamine, tetramethylguanidine, histamine, benzylhydrazine, p-bromophenylhydrazine 1-methyl-1-phenylhydrazine, 4,4-diaminohydrazobenzene, p³-leucaniline, methylamine, morpholine, 5-nitronaphthylamine, 1,2-dimethyl -4-pentenylamine, N,N-diethyl-p-phenylenediamine, piperazine, piperidine, 2-aminopyridine, 6-nitro-o-toluidine, 2-amino-p-toluitrile, 9-phenanthrylamine, and tribenzlamine.

It is important that the organoamine and the organotitanate not be added at the same time. Either the organoamine is added and then the organotitanate is added after a lapse of a defined period of time of at least 1 minute, preferably 5 to 15 minutes or the organotitanate is added first and then the organoamine is added after a lapse of a defined period of time. The organotitanate is preferably added first. The temperatures are not narrowly critical, as stated above, preferably the temperature ranges from room temperature to 95° C.

The resulting product is a $R''SiY_2O_{0.5}$ endblocked organosiloxane block copolymer. The amounts of (A') is such as to provide the final product with from 24 to 84 mol percent diorganosiloxane units, the amount of (B') + (C') is such as to provide the final product with from 11 to 68 mol percent organosiloxane units and the amount of (D') is such to provide the final product with from 2 to 27 mol percent $R''SiY_2O_{0.5}$ endblocked units. The sum of (A'), (B'), (C') and D') equals 100 mol percent. The $R''SiY_2O_{0.5}$ endblocked organosiloxane block copolymer can be recovered by any of the well known conventional methods. One suitable method, if it is desired to have the product at 100 percent solid, is to strip the solvent and any byproducts under reduced pressure usually not exceeding 150° C. The product can also be used in solution as such or once the original solvent is removed it can be put into another solvent.

The $R''SiY_2O_{0.5}$ endblocked organosiloxane block copolymer is a room temperature vulcanizable composition which is stable under anhydrous conditions but cures upon exposure to moisture. The block copolymers of the present invention cure to resins and elastomers depending upon the starting makeup of the hydroxyl terminated polydiorganosiloxane (A'). When the polydiorganosiloxane blocks (1) and (2) are present in proportions sufficient to provide an average of 25 to 45 inclusive diorganosiloxane units per block in the total amount of the polydiorganosiloxane blocks in (A), the cured product is a resin. When the polydiorganosiloxane blocks (1) and (2) are present in proportions sufficient to provide an average of 65 to 460 inclusive diorganosiloxane units per block in the total amount of the polydiorganosiloxane blocks in (A), the cured product is an elastomer. When the polydiorganosiloxane blocks (1) and (2) are present in proportions sufficient to provide an average between 45 and 65 diorganosiloxane units per block in the total amount of the polydiorganosiloxane blocks in (A), the cured product exhibits properties of both resins and elastomers.

The resin room temperature vulcanizable compositions of the present invention have higher tensile strength and tear strength compared to compositions prepared from hydroxyl terminated polydiorganosiloxanes having the same average chain length but not a mixture of widely varying molecular weight polymers.

The elastomeric room temperature vulcanizable compositions of the present invention have a lower modulus and higher tensile strength and tear strength compared to compositions prepared from hydroxyl terminated polydiorganosiloxanes having the same average chain length but not a mixture of widely varying molecular weight polymers.

The room temperature vulcanizable compositions of the present invention are optically clear when the organosiloxane (B) contains alkyl groups in an amount of at least 10 percent and preferably from 20 to 40 percent.

The room temperature vulcanizable compositions of the present invention are useful as sealants, caulking compounds, flexible coatings, roof coatings and coatings over silicone rubber which resist dirt pick up.

The compositions of the present invention can also include fillers, pigments and other additives which are conventionally used in siloxane products. Catalysts which are known to enhance the curing of the compositions of the present invention can be used in curing these compositions.

The following examples are presented for illustrative purposes only and should not be construed as limiting the present invention which is properly delineated in the claims. The preparations in the following examples are carried out under anhydrous conditions unless otherwise stated.

EXAMPLE 1

A blend of 91.2 g. of a hydroxyl terminated polydimethylsiloxane having an average of 265 dimethylsiloxane units per molecule and 8.8 g. of a hydroxyl terminated polydimethylsiloxane having an average of 8 dimethylsiloxane units per molecule in 400 g. of toluene was prepared. To the resulting mixture, sufficient monophenyltriacetoxysilane was added to provide one molecule of monophenyltriacetoxysilane per silicon-bonded hydroxyl radical in the mixture of polydimethylsiloxanes. This mixture was allowed to react for one hour at room temperature with mild agitation. Thereafter, 119 g. of a toluene solution of 56 weight percent hydroxylated organosiloxane resin having 90 mol percent monophenylsiloxane units and 10 mol percent phenylmethylsiloxane units and 6.4 weight percent silicon-bonded hydroxyl radicals and 0.25 weight percent of N-butylamine based on the weight hydroxylated organosiloxane resin was added. The reaction mixture was heated to 50° C. under mild agitation for 1.5 hours. The mixture was then cooled to room temperature and 40 g. of methyltriacetoxysilane was added. The mixture was allowed to react for 15 minutes at room temperature with mild agitation and then the mixture was stripped to 100° C. under a reduced pressure of 10 to 20 mm. of Hg. The resulting product was an acetoxy functional organosiloxane block copolymer having $$CH_3(CH_3\overset{O}{\overset{\|}{C}}O)_2SiO_{0.5}$$

end blocking units. The product was stable under anhydrous conditions but cured to an elastomer when exposed to moisture. A sample cured for 7 days at room temperature had a durometer on the Shore A Scale of 44, an elongation at break of 350 percent, a tear strength, Die B, of 165 p.p.i., a tensile strength at break of 750 p.s.i.; and a tensile strength at 50 percent elongation of 80 p.s.i. The cured sample showed no dirt retention after being exposed to an industrial atmosphere for one year.

EXAMPLE 2

An acetoxy functional organosiloxane block copolymer was prepared as described in Example 1 except that instead of the blend of hydroxyl terminated polydimethylsiloxanes a single hydroxyl terminated polydimethylsiloxane having an average of 34 dimethylsiloxane units per molecule was used. The acetoxy functional organosiloxane block copolymer cured as described in Example 1 had a durometer on the Shore A Scale of 75, an elongation at break of 60 percent, a tear strength, Die B, of 70 p.p.i., a tensile strength at break of 560 p.s.i. and a tensile strength of 50 percent elongation of 500 p.s.i.

EXAMPLE 3

An acetoxy functional organosiloxane block copolymer was prepared as described in Example 1, except that the following ingredients replaced the corresponding ingredients of Example 1.

43 parts by weight of a mixture of 38.6 weight percent of a hydroxyl terminated polydimethylsiloxane having an average of 14 dimethylsiloxane units per molecule and 61.4 weight percent of a hydroxyl terminated polydimethylsiloxane having an average of 350 dimethylsiloxane units per molecule, and 57 parts by weight of the hydroxylated organosiloxane resin where the corresponding ingredients have been considered to equal 100 parts by weight.

The resulting acetoxy function organosiloxane block copolymer was cured as described in Example 1. The durometer on the Shore A Scale was 89, the tensile strength at break was 1,180 p.s.i., the tensile strength at yield was 1,140 p.s.i., the elongation was 10 percent and the tear strength, Die B, was 260 p.p.i., the elongation was 10 percent and the tear strength, Die B, was 260 p.p.i. The butt joint adhesion for glass was 488 p.s.i. and the lap shear adhesion for wood was 482 p.s.i. and for aluminum 536 p.s.i.

EXAMPLE 4

A. An acetoxy functional organosiloxane block copolymer was prepared as described in Example 1, except that the following ingredients replaced the corresponding ingredients of Example 1.

47.6 parts by weight of a mixture of 91.18 weight percent of a hydroxyl terminated polydimethylsiloxane having an average of 400 dimethylsiloxane units per molecule and 8.82 weight percent of a hydroxyl terminated polydimethylsiloxane having an average of 8 dimethylsiloxane units per molecule, 3.7 parts by weight of monophenyltriacetoxysilane was used, 24.8 parts by weight of a hydroxylated organosiloxane resin having 70 mol percent monophenylsiloxane units and 30 mol percent monopropylsiloxane units, and 23.8 parts by weight of methyltriacetoxysilane. Enough toluene was used to provide a final solution having 30 weight percent solids.

The acetoxy functional organosiloxane block copolymer cured at room temperature to an optically clear elastomer.

B. Repeating A above and substituting a hydroxylated organosiloxane resin having 90 mol percent monophenylsiloxane units and 10 mol percent monopropylsiloxane units for the hydroxylated organosiloxane resin of A. The resulting acetoxy functional organosiloxane block copolymer cured to an optically clear elastomer.

That which is claimed is:

1. A room temperature vulcanizable composition stable in the absence of moisture and curable upon exposure to moisture consisting essentially of an organosiloxane block copolymer consisting essentially of (A) 24 to 84 inclusive mol percent of diorganosiloxane units wherein the diorganosiloxane units are bonded through silicon-oxygen-silicon bonds forming polydiorganosiloxane block, said polydiorganosiloxane block consisting essentially of a mixture of (1) polydiorganosiloxane blocks having an average of from 6 to 40 inclusive diorganosiloxane units per block and (2) polydiorganosiloxane blocks having an average of from 200 to 500 inclusive diorganosiloxane units per block, polydiorganosiloxane blocks (1) and (2) being present in amounts sufficient to provide an average of 25 to 460 diorganosiloxane units per block in the total amount of the polydiorganosiloxane block in (A), said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units, (B) 11 to 68 inclusive mol percent organosiloxane units having an average formula $R_xSiO_{4-x/2}$ where $x$ has a value of from 1 to 1.3 inclusive and R is an organic group selected from the group consisting of aryl radicals, vinyl radicals, and alkyl radicals having from 1 to 3 inclusive carbon atoms per radical, said organic groups being at least 50 percent aryl radicals based on the total number of organic groups in (B), said organosiloxane units comprise a block of at least 3 organosiloxane units and said organosiloxane units being selected from monoorganosiloxane units and diorganosiloxane units, and (C) 2 to 27 inclusive mol percent of endblocking siloxane units of the formula $R'SiY_yO_{3-y/2}$ where $y$ has an average value from 1.8 to 2 inclusive, R' is an organic radical selected from the group consisting of alkyl radicals having from 1 to 5 inclusive carbon atoms, phenyl radicals and vinyl radicals and Y is a monovalent radical selected from the group consisting of acetoxy radicals, alkoxy radicals having from 1 to 1 inclusive carbon atoms per radical and radicals of the formula —O—N=X wherein X is selected from the group consisting of radicals of the formula $R''_2C=$ and

in which R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals, the mol percentage of (A), (B) and (C) being based on the total number of siloxane units in the organosiloxane block copolymer.

2. The room temperature vulcanizable composition of claim 1 wherein Y is acetoxy.

3. The room temperature vulcanizable composition of claim 1 wherein the polydiorganosiloxane blocks (1) and (2) are present in amounts sufficient to provide an average of 25 to 45 diorganosiloxane units per block in the total amount of the polydiorganosiloxane blocks in (A).

4. The room temperature vulcanizable composition of claim 3 wherein Y is acetoxy.

5. The room temperature vulcanizable composition of claim 1 wherein the polydiorganosiloxane blocks (1) and (2) are present in amounts sufficient to provide an average of 65 to 450 diorganosiloxane units per block in the total amount of the polydiorganosiloxane blocks in (A).

6. The room temperature vulcanizable composition of claim 5 wherein Y is acetoxy.

7. The room temperature vulcanizable composition of claim 1 wherein the organic groups are at least 10 percent alkyl radicals.

8. The room temperature vulcanizable composition of claim 7 wherein the organic groups are from 20 to 40 percent alkyl radicals.

9. The room temperature vulcanizable composition of claim 7 wherein the polydiorganosiloxane blocks (1) and (2) are present in amounts sufficient to provide an average of 65 to 450 diorganosiloxane units per block in the total amount of the polydiorganosiloxane blocks in (A).

10. The room temperature vulcanizable composition of claim 9 wherein Y is acetoxy.

11. The room temperature vulcanizable composition of claim 9 wherein the organic groups are from 20 to 40 percent alkyl radicals.

12. The room temperature vulcanizable composition of claim 11 wherein Y is acetoxy.

13. A method for preparing a room temperature vulcanizable composition comprising (I) mixing in an inert organic solvent under anhydrous conditions (A') a hydroxyl terminated polydiorganosiloxane which is a mixture of (1') a hydroxyl terminated polydiorganosiloxane having an average from 6 to 40 inclusive diorganosiloxane units per molecule and (2') a hydroxyl terminated polydiorganosiloxane having an average from 200 to 500 inclusive diorganosiloxane units per molecule, said hydroxyl terminated polydiorganosiloxanes (1') and (2') being present in the mixture in amounts sufficient to provide an average of 25 to 460 diorganosiloxane units per molecule in the mixture, said hydroxyl terminated polydiorganosiloxane block (A') being at least 80 mol percent dimethylsiloxane units based on the total number of siloxane units in (A') and any remaining units being selected from the group consisting of phenylmethylsiloxane units and monomethylsiloxane units and said hydroxyl terminated polydiorganosiloxane (A') having from 0.1 to 1.82 weight percent silicon-bonded hydroxyl radicals, and (B') a trifunctional organosilane of the formula $RSiX_3$ in which R is a monovalent organic radical selected from the group consisting of phenyl, vinyl, methyl, ethyl and propyl radicals and X is a hydrolyzable radical elected from the group consisting of acetoxy, ketoxime, chlorine and alkoxy wherein (B') is present in an amount sufficient to provide at least one $RSiX_3$ per silicon-bonded hydroxyl radical whereby a $RS_2SiO_{0.5}$ terminated polydiorganosiloxane is obtained in an inert organic solvent, (II) adding under anhydrous conditions to the $RX_2SiO_{0.5}$ terminated polydiorganosiloxane in an inert organic solvent obtained in (I), (C') a hydroxylated organosiloxane resin of the average unit formula $R'_xSiO_{4-x/2}$ where r' is a monovalent organic radical selected from the group consisting of an aryl radical, a methyl radical, a ethyl radical and a propyl radical and x has an average value of from 1 to 1.3 inclusive in said hydroxylated organosiloxane resin at least 50 percent of the monovalent organic radical being aryl radicals and from 2 to 10 weight percent silicon-bonded hydroxyl radicals based on the total weight of (C'), the mixture is agitated at a temperature of from room temperature to 130° C. for at least 15 minutes whereby a hydroxylated organosiloxane block copolymer having from 0.5 to 5 weight percent silicon-bonded hydroxyl radicals is obtained in an inert organic solvent, thereafter (III) adding under anhydrous conditions to the hydroxylated organosiloxane block copolymer obtained in (II), (D') a trifunctional organosilane of the formula $R''SiY_3$ in which R'' a monovalent organic radical selected from the group consisting of an alkyl radical having from 1 to 5 inclusive carbon atoms a phenyl radical and a vinyl radical and Y is a hydrolyzable radical selected from the group consisting of acetoxy, alkoxy radicals having from 1 to 5 inclusive carbon atoms per radical and ketoxime radicals of the formula —O—N=Z wherein Z is selected from the group consisting of radicals of the formula $R'''_2C=$ and

in which each $R^{iv}$ is selected from the group consisting of divalent hydrocarbon radicals and halogenated divalent hydrocarbon radicals and each R''' is a radical selected independently from the group consisting of monovalent hydrocarbon radicals and halogenated monovalent hydrocarbon radicals, and (IV) maintaining to the mixture of (III) at a temperature of from room temperature to 200° C. for a time sufficient to essentially render the hydroxylated organosiloxane block copolymer free of silicon-bonded hydroxyl radicals whereby a $R''SiY_2O_{0.5}$ enblocked organosiloxane block copolymer is obtained, (A') being present in an amount sufficient to provide from 24 to 84 inclusive mol percent diorganosiloxane units (B')+(C') being present in an amount sufficient to provide from 11 to 68 inclusive mol percent organosiloxane units, and (D') being present in an amount sufficient to provide from 2 to 27 inclusive mol percent $R''SiY_2O_{0.5}$ endblock units, the sum of (A'), (B'), (C') and (D') being 100 mol percent.

14. The method in accordance with claim 13 in which $R''SiY_2O_{0.5}$ enblocked organosiloxane block copolymer is recovered by stripping under reduced pressure at temperatures less than 150°C.

15. The cured composition of claim 1 after exposure to moisture.

16. The cured composition of claim 3 after exposure to moisture.

17. The cured composition of claim 5 after exposure to moisture.

18. The cured composition of claim 7 after exposure to moisture.